United States Patent [19]

MacDonald et al.

[11] 4,059,195
[45] Nov. 22, 1977

[54] MATERIAL HANDLING DEVICE

[75] Inventors: Eric John Christopher MacDonald, Rotherham; Brian Snowdon, Doncaster, both of England

[73] Assignee: Macawber Engineering Limited, Great Britain

[21] Appl. No.: 679,163

[22] Filed: Apr. 22, 1976

[30] Foreign Application Priority Data

Apr. 25, 1975 United Kingdom .............. 17247/75

[51] Int. Cl.² ............................................ B65G 67/24
[52] U.S. Cl. .................................. 214/44 R; 222/166; 214/1 GD
[58] Field of Search ............. 214/44 R, 1 GD, 130 R, 214/508; 298/24, 17 R; 222/164, 165, 166

[56] References Cited
U.S. PATENT DOCUMENTS

| 894,813 | 8/1908 | Buzzell et al. ..................... 302/55 X |
| 2,565,946 | 8/1951 | Bozich ................................... 302/55 |
| 2,744,670 | 5/1956 | Bendot ............................ 222/166 X |
| 3,265,232 | 8/1966 | Lythgoe ........................... 214/508 X |
| 3,412,883 | 11/1968 | Birdsall ............................. 298/24 X |
| 3,539,029 | 11/1970 | Bopp et al. ..................... 222/166 X |

Primary Examiner—Albert J. Makay
Attorney, Agent, or Firm—Stevens, Davis, Miller & Mosher

[57] ABSTRACT

A container for accepting bulk material from a delivery vehicle and mounted for pivotal movement to a position where the load of bulk material may be transferred, in whole or in part, through a closable opening in said container to another suitable receptacle, so avoiding the necessity of deeply excavated pits or tanker-type vehicles.

4 Claims, 3 Drawing Figures

MATERIAL HANDLING DEVICE

This invention relates to bulk material storage and handling and in particular to devices for handling bulk loads delivered from road or other vehicles.

According to the present invention there is provided a material handling device comprising a container mounted for pivotal movement between a first position and a second position, the container having a first opening whereby a bulk load may be passed into the container from a delivery vehicle when the container is in the first position and the container having a closable second opening such that, when the container is in the second position, all or a portion of the material in the container may be passed from the container through said second opening into a suitable receptacle.

A device in accordance with the present invention may be in the form of an open container of sufficient size to accept the total load of a road tipper vehicle. Thus it is preferred that the container in its first position is in the form of an open-topped trough into which material from a tipper vehicle may be loaded and, in the second position, the container is in the form of a hopper having a lower closable outlet through which material may be passed to said receptacle. Preferably one end of the trough is open or openable so that a tipper vehicle may be backed at least partly into said container. Thus when the road tipper vehicle has been backed into the container the trailer of the vehicle may be tilted in the usual way so as to pass the bulk load from the trailer into the container. When the entire contents of the vehicle have been emptied into the container, the vehicle may be driven completely out of the container. The container may then be pivoted from the first position into the second position. In this way the bulk load within the container is moved to a position substantially vertically above the receptacle with the second opening of the container directly above the receptacle. This second opening is provided with a closure, preferably pivotably mounted on the container. This closure may be moved so that material passes from the container into the receptacle.

The device may be provided with a control system so that when the container is in its second position material is only passed to the receptacle when one or more criteria are fulfilled, for instance when the receptacle is not full of material. Furthermore the control system may be such that when the container is emptied it is automatically pivoted back to its first position.

The device of the invention may be of use, for example, where material, which may be wet or dry and may be powdered or granular or in the form of lumps, is to be delivered by road vehicles to a pneumatic conveying system. The device of the invention is used to receive bulk loads of the material and transfer it as required to an air conveying device which in turn conveys the material to another site which may be in the form of, for instance, a storage vessel.

An embodiment of the invention will now be described, by way of example only, and with reference to the accompanying drawings, in which.

Figure 1:
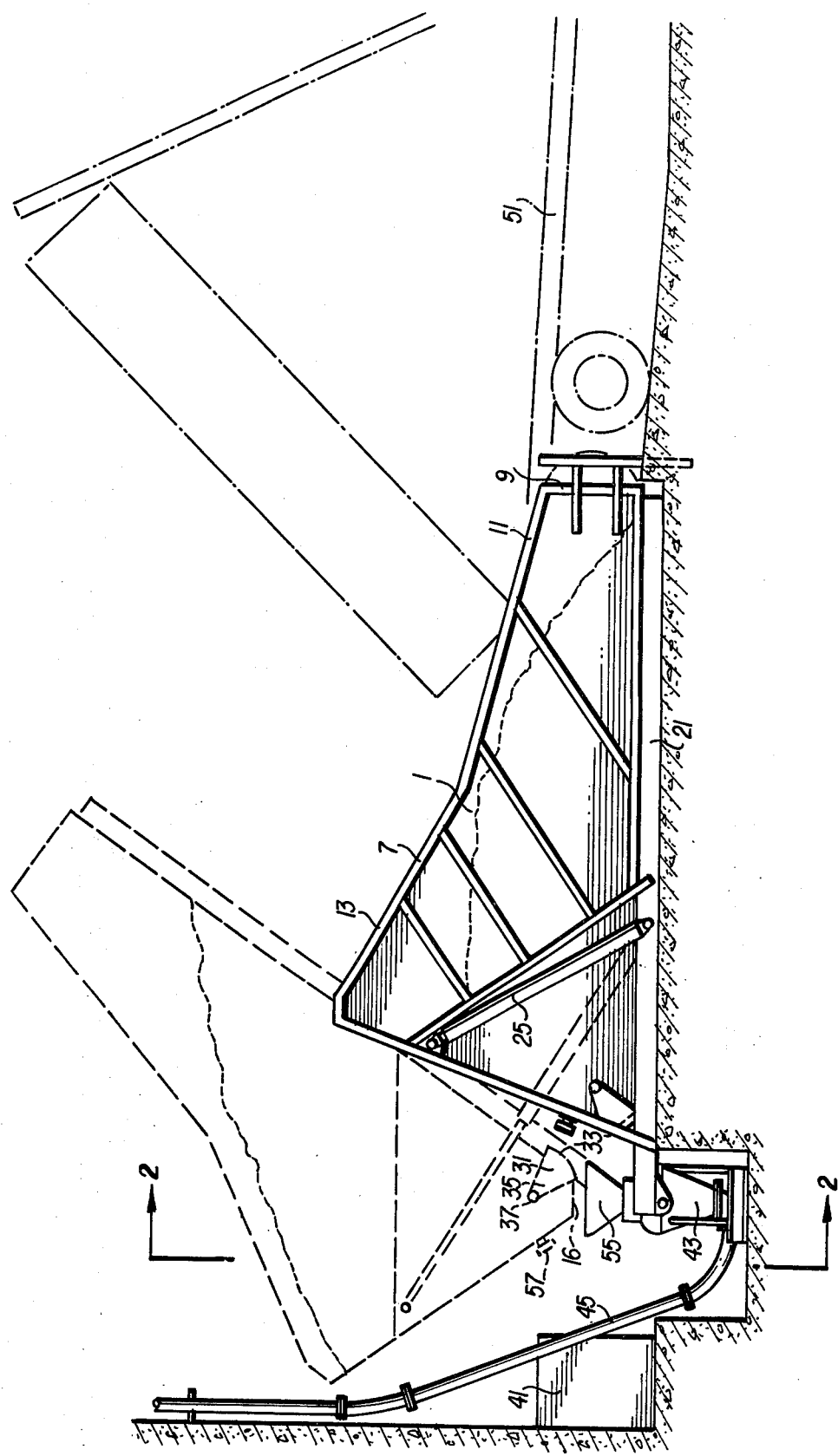
FIG. 1 is a side elevation of a bulk material transfer system including a device in accordance with the present invention.
Figure 2:
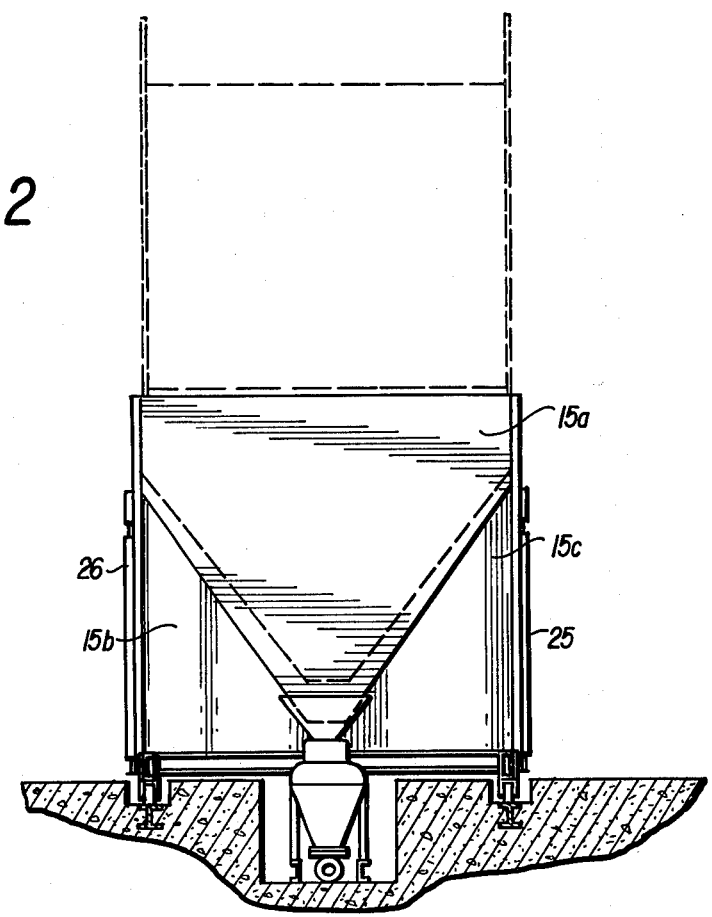
FIG. 2 is a section on line AA of FIG. 1.
Figure 3:
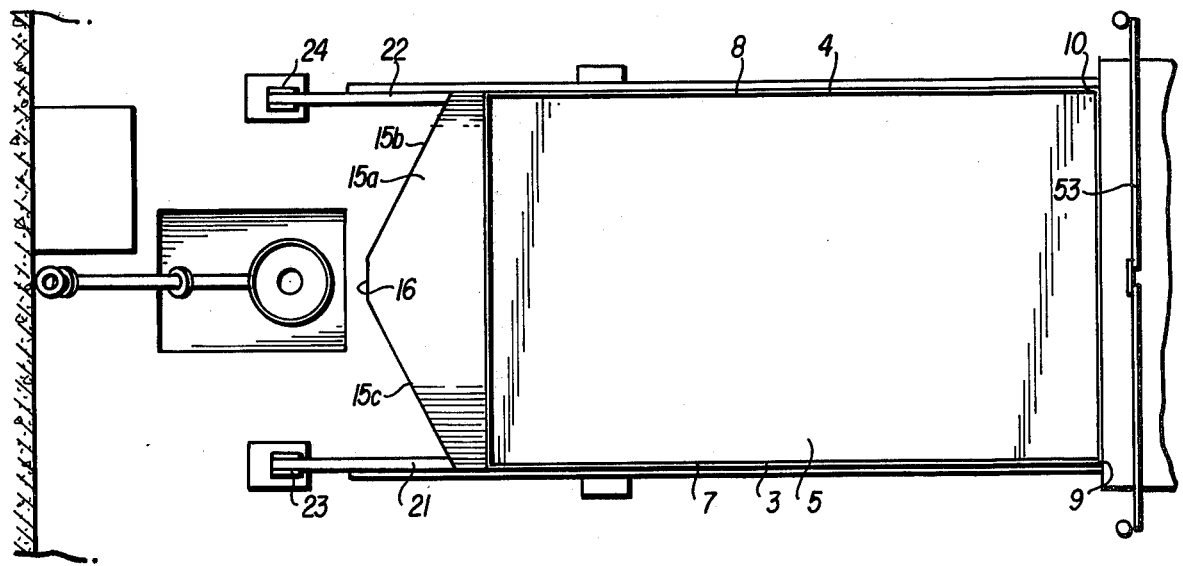
FIG. 3 is a top plan view of the system shown in FIG. 1.

Referring to the drawings, a device in accordance with the present invention includes a container 1 which has flat sides 3 and 4 and a flat, substantially rectangular base 5. Each side 3, 4 has a free upper edge 7, 8, which slopes upwardly from a shallow front edge 9 or 10. Free edges 7, 8 slope upwardly in two portions, a first gently sloping portion 11 extending rearwardly from front edge 9 or 10 and, integral therewith, a more steeply sloping portion 13 which extends to a rear wall 15.

At its rear end the container 1 is provided with walls 15a, 15b and 15c. Wall 15a extends from free edges 7, 8 of side walls 3, 4 and slopes downwardly and also rearwardly. Walls 15b and 15c extend from the rear sides of walls 3 and 4 respectively and slope inwardly and rearwardly towards wall 15a. At the most rearward portion of the container 1 there is provided a square opening 16 which is defined by base 5, and the three walls 15a, 15b and 15c.

Thus as shown in FIG. 1 the container is in the form of an open vessel with a capacity sufficient to take the entire load from a typical road tipper vehicle. At its bottom rear end the container is provided with a small opening 16. There is no front wall and the tipper vehicle may accordingly be backed into the container before commencing to discharge its load.

Container 1 is mounted on a pair of parallel beams 21, 22. Beams 21 and 22 extend from the front edges 9, 10 of side walls 3, 4 of the container rearwardly beyond rear wall 15, the rear ends of beams 21, 22 being mounted in bearings 23, 24 respectively.

The container is also provided with a pair of hydraulic rams 25, 26 located at the sides of the container. One end of each ram is attached to a bracket secured to the container at or near wall 15a and the other end of each ram is attached to a bracket secured to the ground or some structure which in turn is secured to the ground.

Container 1 is also provided with a closure member 31 for opening 16. Closure member 31 is in the form of a curved rectangular plate 33 and side arms 35 which are pivotally mounted on the container 1 at bearing 37. Thus, the closure member 31 is pivotally moveable from a position where opening 16 is closed to a position where opening 16 is open.

As shown in the drawings, the installation includes a hydraulic power pack 41 together with a set of controls. There is also included a receptacle 43 which in this case is an air conveyor which may be filled with material, sealed off and to which compressed air may be applied to blow the material from receptacle 43 into a pipeline 45 and thence to a site where the material is required. Receptacle 43 is located in a shallow pit disposed between bearings 23 and 24 for beams 21 and 22.

When the container 1 is in the position shown in full lines in FIG. 1 it is effectively an open-topped trough, one end of which is open. When the safety gates 53 are opened a road tipper vehicle 51 may be backed into the container to the rear end thereof. The trailer is then tipped and the vehicle slowly driven forward so that the entire load of the vehicle is discharged along the length of the container. The vehicle is then moved away from the container 1. The area within which the container is situated may then be sealed off by means of safety gates 53. The closing of gates 53 causes an electrical signal to be communicated to the hydraulic system as a result of which the rams 25, 26 are caused to telescope from the retracted position shown in full lines in FIG. 1 to the extended position shown in dotted lines in FIG. 1. This results in container 1 being pivoted from the position shown in full lines through an angle of approximately 55° into the position shown in dotted lines. In this position the container is effectively a discharge hopper, the material being dischargeable through closable opening 16. In fact, during the final stage of the pivotal movement of container 1, closure member 31 is caused to swing to one side due to the location of its leading edge against a fixed stop. In this way opening 16 is completely uncovered at the time the container reaches the end of its movement. In this upright position material will pass from container 1 into a feed chute 55 above receptacle 43.

Upon receipt of demand signals from the remotely situated sites for the material, the air conveying receptacle 43 will automatically transfer the material along pipeline 45. This process will continue until either the demand signals from the remote sites are discontinued or the container 1 becomes empty. In the latter case a low level probe 57 situated on a container 1 will indicate the absence of material in the container and the container will then be caused to rotate back to its original position, providing safety gates 53 are closed. The container may then once again be filled with material from a road tipper vehicle.

An advantage of the above described system is that it is able to accept deliveries of bulk material from a road tipper vehicle and deposit the material directly into some form of conveying system or directly into processing equipment. Previously it has only been possible to carry out such a transfer operation either by the use of a tanker vehicle which can transfer material directly to the processing equipment, or if a road tipper vehicle is used, then the conveying system or processing equipment must be situated in a deep pit with a ground bunker which requires considerable excavation of soil.

Since the installation incorporating a device in accordance with the present invention is self-contained and requires a minimum of excavation, the entire installation may be easily relocated at a different site where desired or at a different part of the same site for handling different material.

Furthermore, material may be discharged from a road tipper vehicle at a rate much greater than that which was previously possible for the discharge of materials from tankers, and the large size of the pivotable container enables this to play a valuable role as an intermediate storage container between material deliveries.

It will be appreciated that variations can be made to the above described embodiment without departing from the scope of the present invention. For example the container may be moved mechanically or by means of pneumatic power rather than being moved hydraulically.

We claim:

1. A material handling device for receiving a bulk delivery of granular or lumpy material from a tipper delivery vehicle and for transferring said material to a reception hopper of pneumatic material conveying apparatus, the device comprising a container in the form of an open-topped trough having a base substantially at ground level and having a first open end through which said tipper vehicle may be backed to unload its entire bulk delivery along the length of the container during subsequent forward movement of the vehicle, and a second, substantially funnel-shaped end, opposite said first end, having an apical opening, and a pivotally mounted closure member over said apical opening, the container being mounted for pivotal movement about an axis located a short distance beyond said second end; means connected to the device for moving said container pivotally about said axis between a first position for the reception of said tipper vehicle and its bulk delivery and a second, raised position in which the opening of said apical opening lies just above said reception hopper of the pneumatic conveying means, the pneumatic conveying means being located at least partially below ground level, the device further including means for causing said closure member to open during the latter stage of movement of the container from the first to the second position, the closure member being arranged to return to its original position under the influence of gravity when the container moves from the second to the first position.

2. A device according to claim 1 wherein the means for moving said container pivotally about said axis comprise two hydraulic rams mounted on opposite sides of the container.

3. A device according to claim 2 wherein said hydraulic rams are mounted adjacent the site of the container.

4. A device according to claim 1 wherein the container includes means, responsive to the substantial absence of material in the container, for activating the return of the container to its first position.

* * * * *